(12) United States Patent
Larcher et al.

(10) Patent No.: US 10,431,964 B2
(45) Date of Patent: Oct. 1, 2019

(54) REMOVABLE ELECTRIC CURRENT SWITCHING ELEMENT AND ELECTRICAL SWITCHGEAR FOR SWITCHING AN ELECTRIC CURRENT COMPRISING SUCH A REMOVABLE SWITCHING ELEMENT

(71) Applicant: Schneider Electric Industries SAS, Rueil Malmaison (FR)

(72) Inventors: Patrick Larcher, Echirolles (FR); Patrick Comtois, Saint Ismier (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 15/978,538

(22) Filed: May 14, 2018

(65) Prior Publication Data

US 2018/0337519 A1  Nov. 22, 2018

(30) Foreign Application Priority Data

May 17, 2017  (FR) ..................................... 17 54349

(51) Int. Cl.
*H01H 50/06* (2006.01)
*H02B 13/045* (2006.01)
(Continued)

(52) U.S. Cl.
CPC ......... *H02B 13/045* (2013.01); *H01H 50/048* (2013.01); *H01H 50/06* (2013.01);
(Continued)

(58) Field of Classification Search
CPC .. H02B 13/045; H02B 13/025; H02B 13/065; H02B 13/0358; H02B 13/0352;
(Continued)

(56) References Cited

U.S. PATENT DOCUMENTS 3,962,658 A   6/1976  Zunft et al.
4,326,693 A   4/1982  Noble
(Continued)

FOREIGN PATENT DOCUMENTS

EP   0 344 687 A2   12/1989

OTHER PUBLICATIONS

French Preliminary Search Report dated Jan. 31, 2018 in French Application 17 54349 filed on May 17, 2017 (with English Translation of Categories of Cited Documents and Written Opinion).

*Primary Examiner* — Ahmed M Saeed
(74) *Attorney, Agent, or Firm* — Oblon, McClelland, Maier & Neustadt, L.L.P.

(57) ABSTRACT

A removable electric current switching element includes first and second housing parts fitted to the other and that can be moved between an assembled configuration and a partially disassembled configuration. The first housing part includes side walls provided with through inspection windows, the second housing part includes insulating walls which each delimit a volume in the second housing part around a corresponding mobile conductor. The first and second housing parts are arranged relative to one another in such a way that, in the assembled configuration the insulating walls mask the inspection windows and that, in the intermediate configuration the insulating walls are away from the inspection windows to free access to the inspection windows.

10 Claims, 6 Drawing Sheets

(51) Int. Cl.
*H01H 50/04* (2006.01)
*H02B 13/025* (2006.01)
*H02B 13/035* (2006.01)
*H02B 13/065* (2006.01)
*H01H 9/08* (2006.01)
*H01H 9/02* (2006.01)

(52) U.S. Cl.
CPC ....... *H02B 13/025* (2013.01); *H02B 13/0352* (2013.01); *H02B 13/0358* (2013.01); *H02B 13/065* (2013.01); *H01H 9/085* (2013.01); *H01H 2009/0292* (2013.01); *H01H 2050/046* (2013.01)

(58) Field of Classification Search
CPC ...... H01H 50/06; H01H 50/048; H01H 9/085; H01H 2050/046; H01H 2009/0292; H01H 9/02; H01H 71/04; H01H 9/16; H01H 1/0015; H01H 2071/042; H01H 83/04; H01H 73/12; H01H 47/002; H01H 50/08
See application file for complete search history.

(56) References Cited

U.S. PATENT DOCUMENTS

| | | | | |
|---|---|---|---|---|
| 4,835,348 A * | 5/1989 | Poling | ...................... | H01H 5/18 |
| | | | | 200/302.2 |
| 5,130,684 A * | 7/1992 | Scott | ...................... | H01H 71/16 |
| | | | | 335/43 |
| 5,241,290 A * | 8/1993 | Sehmer | ................... | H01H 71/56 |
| | | | | 335/132 |
| 5,457,444 A * | 10/1995 | Cook | ..................... | H01H 71/04 |
| | | | | 335/18 |
| 5,459,444 A * | 10/1995 | Baer | ...................... | H01H 71/04 |
| | | | | 335/18 |
| 2010/0079973 A1 | 4/2010 | Brandt et al. | | |
| 2010/0163378 A1* | 7/2010 | Kim | ....................... | H02B 11/10 |
| | | | | 200/308 |
| 2013/0032576 A1* | 2/2013 | Rosenkrans | ..... | H01H 33/66207 |
| | | | | 218/134 |
| 2015/0155113 A1* | 6/2015 | Newase | ............ | H01H 71/0207 |
| | | | | 200/293 |
| 2016/0163472 A1* | 6/2016 | Gibson | .................... | H01H 3/04 |
| | | | | 200/238 |

* cited by examiner

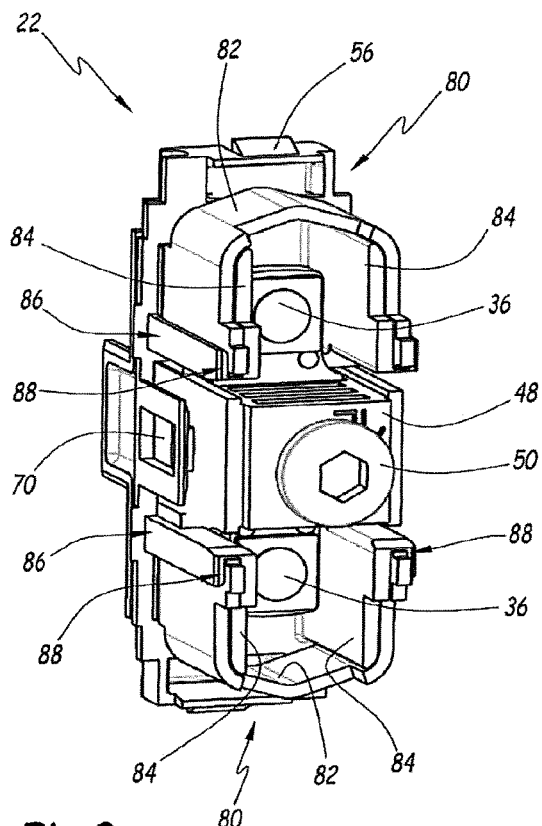
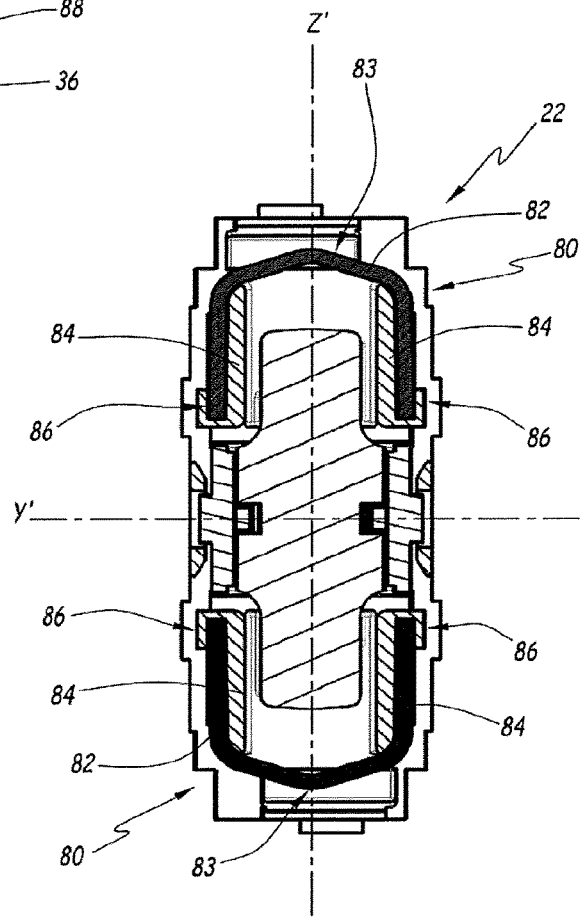
Fig.9
Fig.10

REMOVABLE ELECTRIC CURRENT SWITCHING ELEMENT AND ELECTRICAL SWITCHGEAR FOR SWITCHING AN ELECTRIC CURRENT COMPRISING SUCH A REMOVABLE SWITCHING ELEMENT

The invention relates to a removable electrical switching element for an electrical switching device. The invention also relates to an electrical switching device for switching an electric current comprising such a removable switching element.

Electrical devices for switching an electric current, such as contactors, are known, these devices including one or more removable switching elements that are inserted into housings in a baseplate of the device. These removable elements are sometimes known as switching bulbs. Such a removable element is, for example, described in document FR 2 999 790.

Generally, each removable element is connected to connection lands of the electrical device and acts to selectively interrupt the flow of an electric current between these lands. To do this, each removable element includes separable electrical conductors, the movement of which is controlled by a dedicated actuator moving them between an open position and a closed position with respect to the fixed electrical contacts to interrupt or, respectively, to allow the flow of the electric current.

One advantage of such removable elements is that they are interchangeable and therefore easy to replace during maintenance operations or in the event of malfunction.

However, there is a need to allow an operator to inspect the interior of the removable element, for example to visually gauge the state of wear of the electrical contacts during preventative maintenance operations without having to destroy the removable element. The known removable elements do not allow this need to be met, in particular because they include a sealed housing, the role of which is to prevent breaking gases from being released freely from the removable element.

It is these drawbacks that the invention more particularly aims to overcome, by providing a removable electric current switching element that allows a non-destructive visual inspection while ensuring a good level of tightness with respect to breaking gases.

To this end, the invention relates to a removable electric current switching element comprising:
  a first and a second housing part that are capable of being fitted to one another and that can be reversibly moved with respect to one another between an assembled configuration and a partially disassembled configuration;
  fixed electrical contacts, which are rigidly connected to the first housing part;
  movable electrical contacts that can be moved with respect to the fixed electrical contacts, these movable electrical contacts being housed in the second housing part and being movable with respect to the second housing part;
  the first housing part including side walls provided with through inspection windows;
  the second housing part including insulating walls which each delimit a volume within the second housing part around a corresponding movable conductor;
  the first and second housing parts being arranged relative to one another in such a way that, in the assembled configuration, the insulating walls mask the inspection windows and that, in the intermediate configuration, the insulating walls are away from the inspection windows to free access to the inspection windows.

By virtue of the invention, the removable element allows visual access to the fixed and movable electrical contacts for a visual inspection, despite the presence of the insulating walls, while retaining a good level of tightness with respect to breaking gases. More specifically, the structure of the housing separated into first and second movable parts, as well as the arrangement of the insulating walls with respect to the side walls, allows the insulating windows to be selectively opened so as to look through them to inspect the interior of the housing, and these inspection windows to be closed when the removable element is in operation, to prevent breaking gases from leaking through these insulating windows. Stated otherwise, the presence of the windows does not negatively affect the tightness of the assembly.

According to some advantageous but non-mandatory aspects of the invention, such a removable element may incorporate one or more of the following features, either alone or in any technically permissible combination:
  The insulating walls include retaining members which cooperate with the first housing part to limit the movement of the first and second housing parts from the assembled configuration to the partially disassembled configuration.
  The first and second housing parts are further movable from the partially disassembled position to a dismantled position, in which the first and second housing parts are separated from one another.
  The retaining members are capable of being reversibly separated from the first housing part to allow the first and second housing parts to pass from the partially disassembled configuration to the dismantled configuration.
  The first and second housing parts include attachment members that are complementary to one another for rigidly connecting the first and second housing parts to one another in the assembled configuration.
  The second housing part is provided with a bottom plate which contains at least one channel for removing breaking gases fluidically connecting an inlet opening, in communication with a volume delimited by insulating walls inside the housing, to an outlet opening, in communication with the exterior of the housing.
  The insulating walls and the side walls extend in parallel in one and the same direction, and the first and second housing parts are moved by translation along said direction.
  The inspection windows are made level with the fixed electrical contacts so as to allow the observation thereof through the inspection windows when these windows are free.
  The inspection windows take the shape of an oblong oriented in parallel to the direction of movement of the movable electrical contacts.

According to another aspect, the invention relates to an electrical switching device for switching an electric current comprising a baseplate including one or more housings and a removable electric current switching element, intended to be accommodated in one of the housings of the baseplate, such that the fixed electrical contacts of the removable switching element are electrically connected to connection lands of the switching device. In accordance with the invention, the removable switching element is such as described above.

The invention will be better understood and other advantages thereof will become more clearly apparent in the light of the following description of one embodiment of a removable switching element provided solely by way of example and with reference to the appended drawings, in which:

FIG. 9 is a schematic representation, in a top view, of the second part of the removable switching element of FIG. 2;

FIG. 10 is a schematic representation, in an front view, of the second part of the removable switching element of FIG. 9.

FIG. 1 shows an electrical switching device 2 for switching an electric current, such as an industrial contactor. The electrical device 2 is for example intended to be connected to an electrical power supply line for supplying power to an electric motor.

Figure 1:
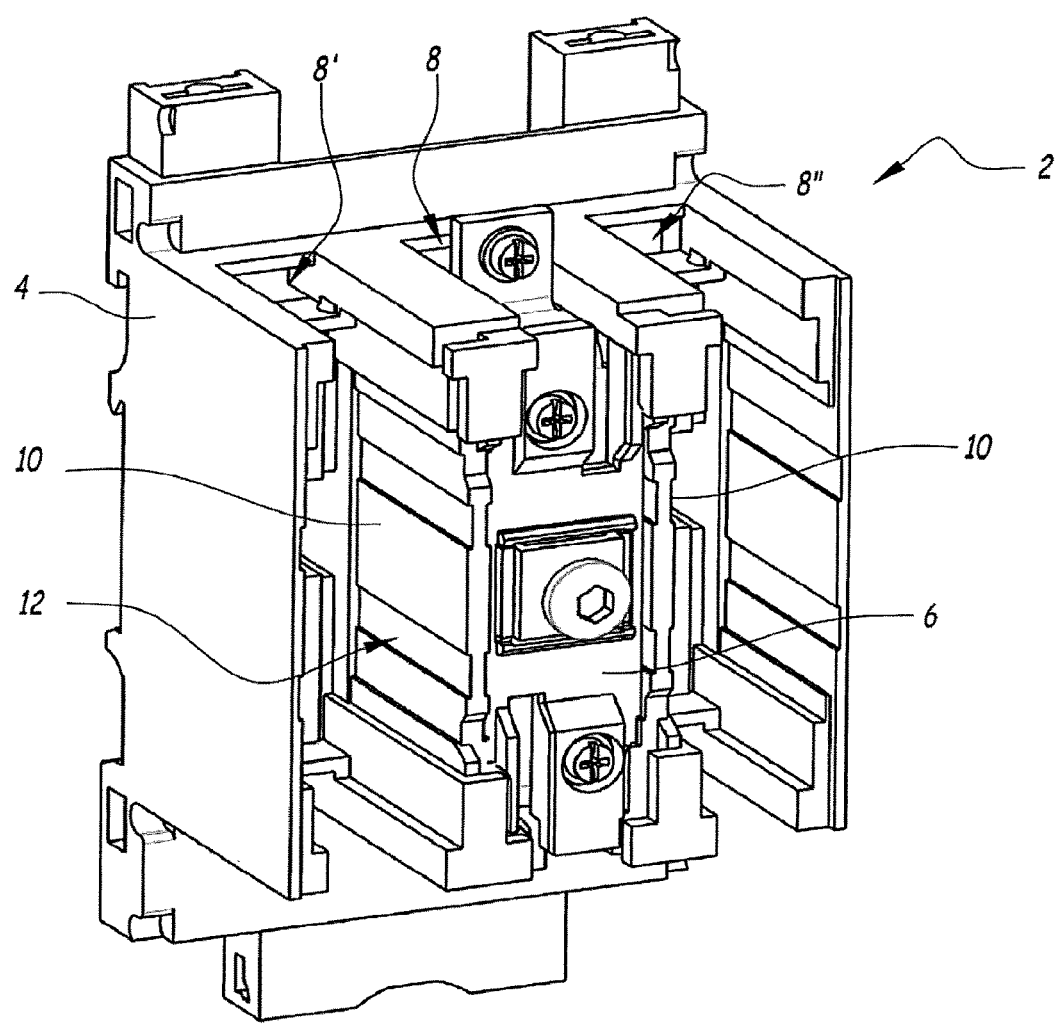
FIG. 1 is a schematic representation, in perspective, of an electrical switching device including a removable switching element in accordance with the invention.

The function of the electrical device 2 is to selectively interrupt an electric current flowing through one or more current conductors, for example a polyphase AC electric current.

The electrical device 2 includes here a baseplate 4, for example intended to be installed in an electrical switchboard, and one or more removable electric current switching elements 6, here referred to as "switching bulbs". Each removable element 6 is suitable for interrupting an electric current, for example one electrical phase of a polyphase current.

The electrical device 2 also includes a controllable actuator (not shown) that is intended to be accommodated on a front face of the baseplate 4 to control the removable elements 6.

In this illustrative example, the electrical device 2 is suitable for interrupting a three-phase current including three electrical phases, and is therefore suitable for accommodating three removable elements 6, each associated with one of these electrical phases.

The baseplate 4 includes here housings 8, 8' and 8", numbering three and being identical to one another, each being suitable for accommodating a removable element 6. The housings 8, 8' and 8" are therefore complementary in shape to the removable elements 6.

The housings 8, 8' and 8" are here separated pairwise by separating walls 10 which are preferably made of an electrically insulating material, such as a plastic material. The separating walls 10 include here grooves 12 for guiding the insertion of the removable element 6.

As a variant, the number of removable elements 6 may be different. The baseplate 4 is then adapted accordingly.

To simplify FIG. 1, only one example of the removable element 6 is illustrated. In this example, the removable elements 6 are identical to one another. The removable element 6 is illustrated accommodated inside the housing 8.

Figure 2:
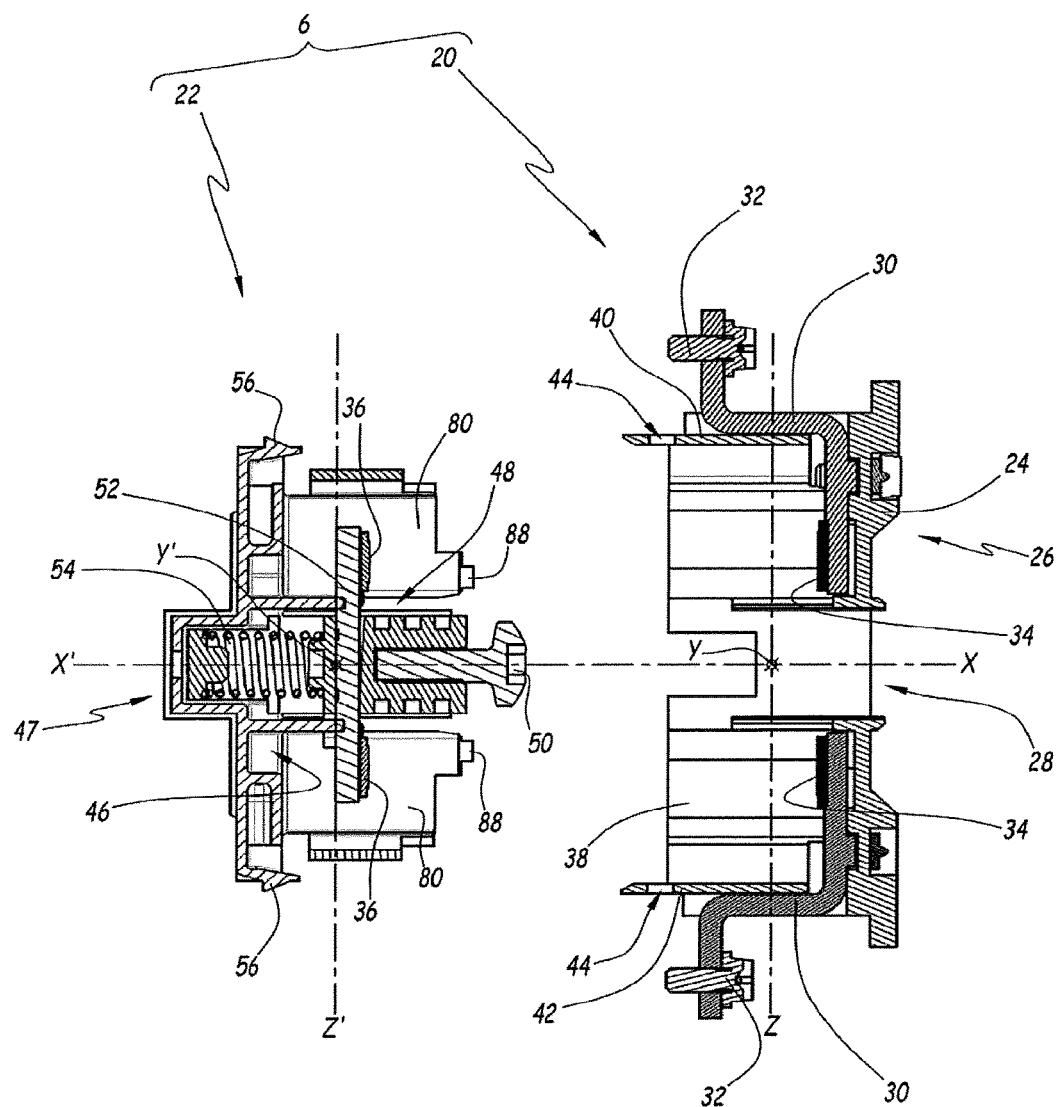
FIG. 2 is a schematic representation, along a longitudinal section, of first and second parts of the removable switching element of FIG. 1, in an exploded view.

As illustrated in FIG. 2, the removable element 6 includes a housing formed of a first housing part 20 and of a second housing part 22, which are capable of being fitted to one another to form the removable element 6.

The first and second parts 20, 22 are here distinct and selectively and reversibly movable with respect to one another, between multiple distinct configurations. In this example, as explained in greater detail below, the parts 20 and 22 are movable between:

an assembled configuration, in which the parts 20 and 22 are completely fitted to one another; and an intermediate configuration, also referred to as the "observation configuration" or "partially disassembled configuration", in which the second part 22 is partially fitted to the first part 20.

Optionally, the parts 20 and 22 can also be moved into a dismantled configuration, in which the parts 20 and 22 are completely separated from one another.

The assembled configuration corresponds to the operating configuration of the removable element 6, allowing it to be accommodated in the baseplate 4. For illustrative purposes, FIG. 2 shows the parts 20 and 22 in their dismantled configuration.

The first part 20, also referred to as the front part, includes a first bottom plate 24, which forms an essentially planar front face 26 of the removable element 6. The front face 26 is provided with a through window 28.

The front part 20 further includes connection terminals 30, which are attached to the bottom plate 24 and which are intended to be connected to electrical connection lands of the device 2, so as to connect the removable element 6 to an electrical circuit. These terminals 30 here number two and are electrically isolated from one another.

For example, the terminals 30 extend from the interior of the front part 20 to the exterior thereof, and are held fixed to the connection lands by means of retaining screws 32. These terminals 30 include fixed electrical contacts 34, which are intended to cooperate with movable electrical contacts 36 of the removable element 6. These fixed contacts 34 are here accommodated inside the front part 20.

In this example, the front part 20 takes the shape of an oblong extending along a longitudinal axis Z. The axis Z corresponds here to a vertical direction when the removable element 6 is accommodated inside the baseplate 4. For example, the two terminals 30 extend in parallel to this axis Z.

"X" denotes an axis that is perpendicular to the front face 26 and to the longitudinal axis Z of the front part 20. "Y" denotes a transverse axis of the front part 20, this transverse axis Y being perpendicular to the axes X and Z.

The front part 20 includes here side walls 38 which extend in parallel on either side of a longitudinal median plane of the front part 20, perpendicularly to the axis Y. These side walls 38 define here an interior volume that is intended to accommodate the rear part 22 in the assembled configuration.

The side walls 38 are here provided with lateral voids 46, the role of which is explained below.

Optionally, the front part 20 includes attachment members 44, the role of which is described in greater detail below. These attachment members 44 are here borne by upper 40 and lower 42 walls, which extend in parallel to a transverse median plane that is parallel to the axes X and Y.

The rear part 22 of the housing includes a second bottom plate 46, which forms here an essentially planar back face 47 of the removable element 6. The rear part 22 extends along a longitudinal axis Z'. "X'" denotes an axis that is perpendicular to the axis "Z'" and to the back face 52. Additionally, "Y'" denotes a transverse axis that extends perpendicularly to the axes X' and Z'.

In the assembled configuration of the removable element 6, the bottom plates 24 and 46 are opposite and facing one another. The axes Z and Z' are then merged with one another. The same applies for the axes X and X' and for the axes Y and Y'.

The rear part 22 includes the movable contacts 36. These movable contacts 36 here number two and are electrically connected to one another.

In the assembled configuration of the removable element 6, the movable contacts 36 are positioned facing the corresponding fixed contacts 34.

The movable contacts 36 are selectively and reversibly movable with respect to the fixed contacts 34, between an open position and a closed position, which are distinct from one another. This movement is here performed by translation along a direction of movement that is here parallel to the axis X'.

In the open position, the electrical contacts 34 and 36 are away from one another and are thus electrically insulated from one another by the ambient air. In the closed position, each of the contacts 34 is brought into contact with a corresponding movable contact 36, allowing an electric current to flow between the two terminals 30. This contact is advantageously made by virtue of contact pads borne by the electrical contacts 34 and 36.

To allow this movement, the rear part 22 includes here a movable contact holder 48 that can be moved in translation along the axis X' with respect to the bottom plate 46. This movable contact holder 48 includes a gripping member 50 and an electrically conductive element 52, which are together referred to as a movable bridge, here in the shape of a plate, which connects the movable contacts 36 to one another.

The gripping member 50 is intended to be mechanically coupled to the actuator of the switching device 2, to drive the movement of the movable contacts 36 between the open and closed positions. In the assembled configuration of the removable element 6, the window 28 allows the passage of the contact holder provided with its gripping member 50.

For example, the movable contact holder 48 includes a body made of an electrically insulating material which is rigidly connected to the element 52 and to which the gripping member 50 is attached. The gripping member 50 is here a screw head.

The movable contact holder 48 also includes an elastic return member 54, such as a helical spring, which is arranged to exert a return force on the movable bridge 52, along the direction of movement X', so as to return the movable contacts 36 to the open position when no force is exerted by the actuator of the device 2.

By way of illustrative example, the movable contacts 36 are here positioned on either side of the movable bridge 52 along the axis Z', this movable bridge 52 occupying a central position within the rear part 22.

In this embodiment, the rear part 22 also includes attachment members 56, which are intended to cooperate with the attachment members 44 borne by the front part 20. These attachment members 44, 56 allow the parts 20 and 22 to be reversibly rigidly connected to one another in their assembled configuration.

Thus, the parts 20 and 22 can easily be separated from one another by an operator, for example to visually inspect the interior of the removable element 6, and they can then be just as easily assembled back together. This facilitates the maintenance of the removable element 6 and of the electrical device 2.

For example, the members 44 and 56 allow attachment by snap-fastening. The member 44 is here a female member, such as an opening, while the member 56 is a male member, such as a deformable hook, here formed as a single piece with the bottom plate 46. As a variant, the members 44 and 56 are male and female members, respectively.

The movement of the movable contacts 36 with respect to the rest of the rear part 22 is here independent of the movement of the parts 20 and 22 between their various configurations.

Figure 3:
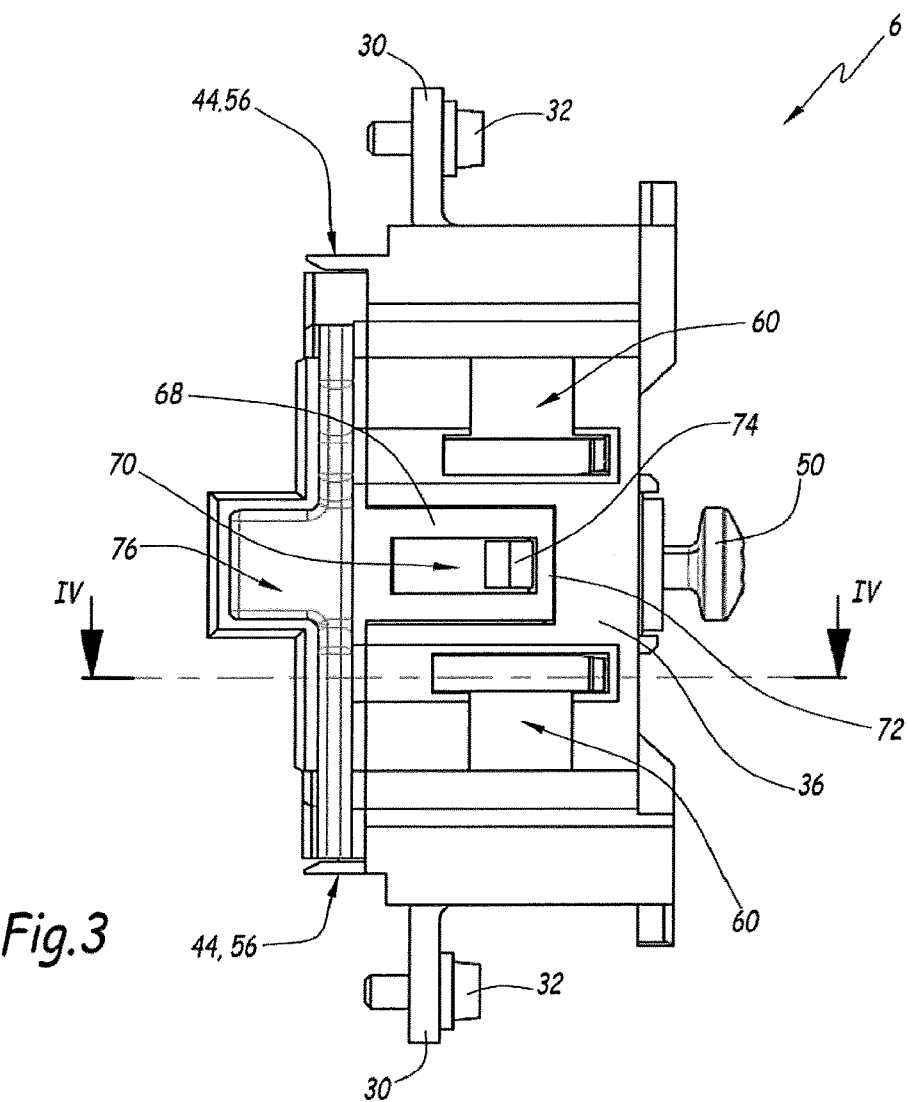
FIG. 3 is a schematic representation, in profile, of the removable switching element of FIGS. 1 and 2, in a first configuration.
Figure 4:
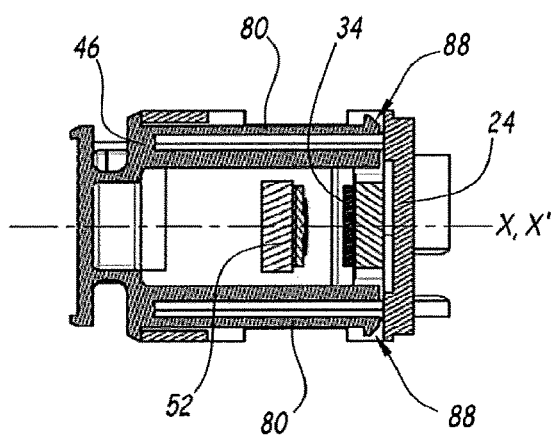
FIG. 4 is a schematic representation of a part of the removable switching element of FIG. 3, illustrated in the sectional plane IV-IV.
Figure 5:
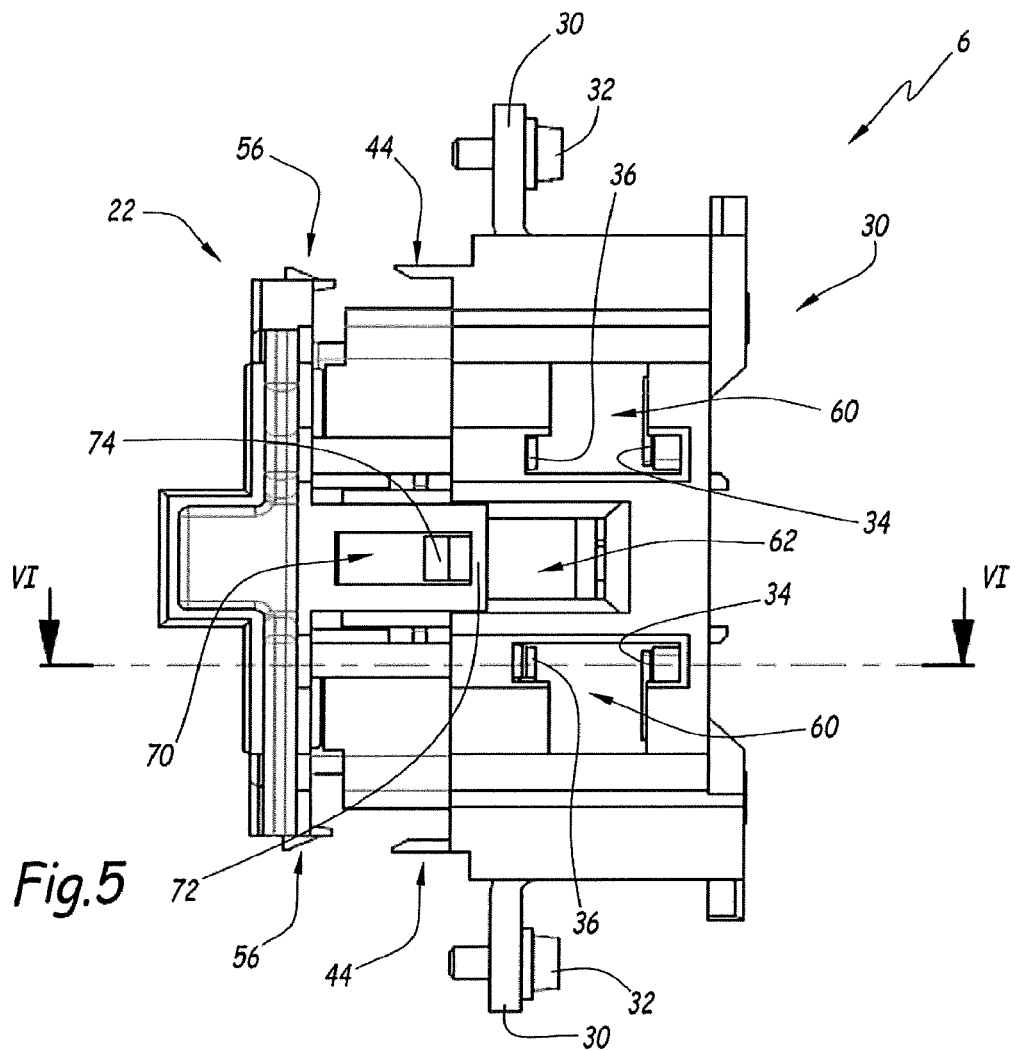
FIG. 5 is a schematic representation, in profile, of the removable switching element of FIG. 3, in a second configuration.
Figure 6:
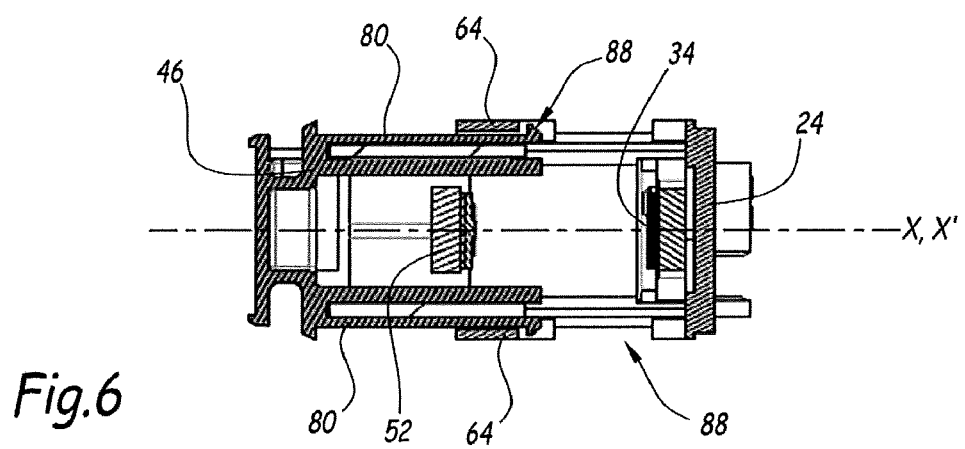
FIG. 6 is a schematic representation of a part of the removable switching element of FIG. 5, illustrated in the sectional plane VI-VI.
Figure 7:
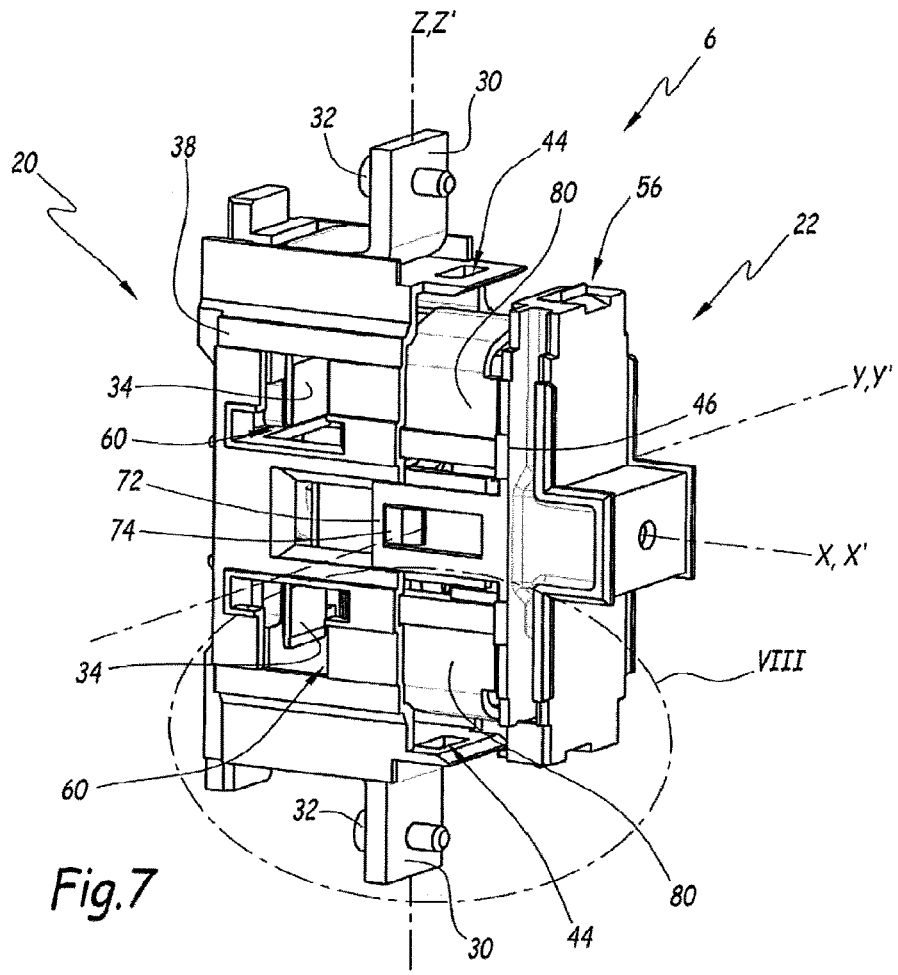
FIG. 7 is a schematic representation of the removable switching element of FIG. 5, in perspective.
Figure 8:
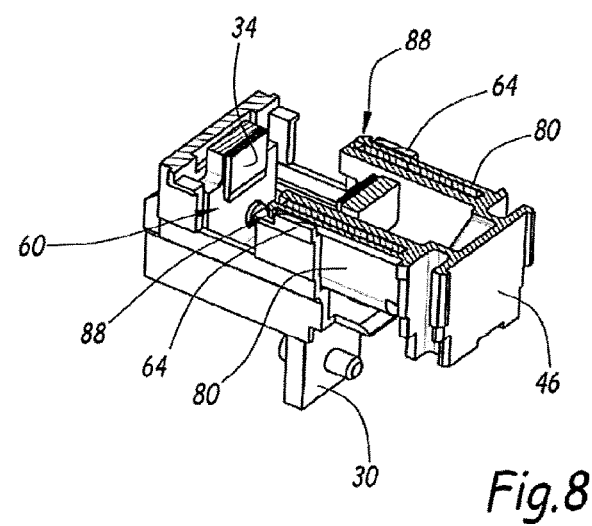
FIG. 8 is a schematic representation, in a cutaway view, of a portion VIII of the removable switching element of FIG. 9.

FIGS. 3 and 4 illustrate the parts 20 and 22 in the assembled configuration and FIGS. 5 and 6 illustrate the parts 20 and 22 in the intermediate configuration.

The front part 20 further includes through inspection windows 60 which are made in the side walls 38 by voids therein. The inspection windows 60 are placed level with the fixed contacts 34.

Preferably, the inspection windows 60 take the shape of an oblong oriented in parallel to the direction of movement of the movable contacts 36. They take the form here of a rectangle extending in particular in parallel to the axis X.

These inspection windows 60 thus allow the contacts 34 and 36 to be observed in the intermediate configuration and in the dismantled configuration. However, in the assembled configuration, the inspection windows 60 are closed by walls 80 of the rear part 22, as explained below.

In this example, the front part 20 includes four such inspection windows 60. Two windows 60 are positioned on either side of each fixed contact 34, on the opposite side walls 38.

The inspection windows 60 that are associated with one and the same electrical contact 34 are preferably placed facing one another, thereby facilitating observation.

The side walls 38 also include lateral voids 62. These voids 62 here number two, each being made in one of the side walls 38, and take the form of a rectangle extending in parallel to the axis X.

The front part 20 also includes blocking walls 64, the role of which is to hold the rear part 22 in abutment when it is moved from the assembled configuration to the intermediate configuration, as explained below.

In this example, the rear part 22 further includes a guiding portion 66, which allows the movable contact holder assembly 52 to move in translation along the direction of movement X'. The guiding portion 66 is here formed level with the side walls 68 of the rear part 22 which extend on either side of the contact holder 48 along directions that are parallel to the axes X' and Z'.

In the assembled configuration, the side walls 68 are accommodated in the lateral voids 62. It is therefore understood that the respective shapes of the side walls 68 and of the lateral voids 62 are chosen so as to be complementary.

The lateral walls 68 are here planar in shape and include an oblong opening 70 extending along the axis X' and forming a guide rail. The opening 70 is delimited by edges 72 which form an end stop limiting the movement of the contact holder 48 along the axis X' with a predefined travel.

Complementarily, the contact holder 48 includes hooks 74 which are accommodated inside the opening 70. These hooks 74 include for example a sloped edge that is intended to facilitate their insertion into the opening 70.

The bottom plate 46 also includes a channel 76 for removing breaking gases. The function of the channel 76 is to allow breaking gases to cool and to allow them to be conveyed out of the removable element 6.

In a known manner, when the electrical contacts 34 and 36 are separated in the presence of an electric current, an electric arc appears which ionizes the ambient air, giving rise to a breaking gas. The temperature of this breaking gas is high and it should, preferably, be cooled before being expelled from the removable assembly 6. Specifically, this breaking gas is electrically conductive when it is hot. If it is expelled from the removable element 6 without being sufficiently cooled, it may lead to a risk of loopback of the electric current, i.e. a short circuit, between the connection lands of the device 2, which is dangerous and obviously not desirable.

Thus, the second bottom plate 46 advantageously contains at least one channel 76 for removing the breaking gases, which fluidically connects an inlet opening, in communication with the interior of the front part 20, to an outlet opening, in communication with the exterior of the housing. The interior of the front part 20 corresponds here to the face of the bottom plate 46 which faces away from the back face 47, i.e. which faces towards the front part 20 when the assembly 6 is in the assembled configuration.

This removal channel 76 may include baffling (not illustrated) that is intended to extend the trajectory of the breaking gas so as to promote its cooling.

For example, the channel 76 is in communication with an outer face of the bottom plate 46. The bottom plate 46 includes one or more inlet openings of this channel 76, as explained below.

The rear part 22 includes side insulating walls 80 which extend from the bottom plate 46, here in the direction X'. These insulating walls 80 at least partially surround the electrical contacts 36. In this example, the insulating walls 80 number two, each surrounding one of the movable contacts 36. The insulating walls 80 are here positioned on either side of the movable bridge 52. In this example, the walls 80 are identical and are positioned symmetrically with respect to the movable bridge 52.

Each insulating wall 80 delimits a volume forming an arc extinguishing chamber around the corresponding movable contact 36. The removal channel 76 includes here an inlet opening in each of these arc extinguishing chambers. As a variant, the bottom plate 46 may also include multiple channels 76, each having one inlet opening associated with just one of the arc extinguishing chambers.

Preferably, the height of the insulating walls 80, measured in parallel to the axis X', is greater than or equal to the travel of the contact holder 48 along the axis X'.

These insulating walls 80 are thus positioned in parallel to and facing the side walls 38, in parallel to the axes X and X'.

Thus, the parts 20 and 22 are moved between the various configurations by translation along the axis X. For example, the walls 38 and 80 are adjacent to one another and spaced apart by a short distance, for example shorter than or equal to 0.5 mm, this distance being measured in parallel to the axis Y. A short distance allows the walls 38 and 80 to slide with respect to one another, without however negatively affecting the tightness of the assembly. In practice, the clearance between the walls 38 and 80 is chosen so as to allow the pieces to be assembled and the parts 20 and 22 to slide to allow the movement between the assembled and intermediate configurations and depends in particular on the size of the removable element 6. By way of illustration, the distance is here comprised within the range [0.4 mm-0.5 mm].

The side walls 38 thus allow the walls 80 to be guided during the movement of the part 22 with respect to the part 20.

Moreover, in the assembled configuration, the walls 80 are located in front of the inspection windows 60 so as to close these inspection windows 60. In this way, the risk of the breaking gases escaping from the removable element 6 other than via the channel 76 is limited.

However, in the intermediate configuration, the walls 80 are located away from the inspection windows 60, so as to free these inspection windows 60. Stated otherwise, the windows 60 are open in the intermediate configuration. The same applies in the dismantled configuration.

By way of illustrative example, in the assembled configuration, the walls 80 are accommodated over at least 80% of their height in the part 20, i.e., over at least 80% of their height, the walls 80 overlap with the side walls 38. Analogously, in the intermediate configuration, the walls 80 are accommodated over at least 10% of their height in the part 20.

Advantageously, the walls 80 include retaining members 88 which are intended to cooperate with the first part 20, here with the blocking walls 64, to retain the part 22 with respect to the part 20 when they are moved to the intermediate configuration from the assembled configuration. More specifically, the retaining members 88 come into abutment against the walls 64 when the part 22 is removed from the part 20. The members 88 take the shape here of hooks protruding perpendicularly to the walls 80, in parallel to the axis Y'. Thus, the travel of the part 22 with respect to the part 20 has a predefined value.

By virtue of the invention, the insulating windows 60 may be selectively opened to inspect the interior of the housing, for example when the element 6 is removed from the baseplate during maintenance, by switching the element 6 to the intermediate configuration. Next, when the element 6 is placed back in the assembled configuration with a view to putting it back into operation, these windows 60 are closed again, thereby preventing the gas from escaping through these windows 60. By virtue of this tightness, the breaking gases are preferentially removed via the removal channel 76, and are therefore better cooled. This limits the risk of loopback of an electric current outside the removable element 6. The safety and the reliability of the device 2 are therefore improved.

Thus, the element 6 allows the electrical contacts 34, 36 to be visually inspected by virtue of the windows 60, without the presence of these windows 60 negatively affecting the tightness of the assembly 6. It is also not necessary to damage the housing to inspect the interior thereof, since its disassembly is reversible.

Additionally, switching between the assembled and intermediate configurations is quick and straightforward and does not require any specific tools, in particular by virtue of the attachment members 44 and 62.

Advantageously, the dismantled configuration allows an operator to access the interior of the assembly 6, for example to clean the electrical contacts 34 and 36 and/or to separate them from one another in the case of accidental welding. This movement may in particular be performed from the intermediate configuration, by separating the retaining members 88 from the walls 64, for example by deforming the walls 80. The parts 20 and 22 may next be placed back in the intermediate configuration with a view to assembling the housing back together.

Preferably, the walls 80 are made of a material that is impermeable to the gases.

In this embodiment, as illustrated in FIGS. 7 to 10, the insulating walls 80 each include a piece 82, referred to as a "blow piece", which is attached to the bottom plate 46. The blow piece 82 is made of a magnetic material, for example a ferromagnetic material, and its function is to promote the blow, i.e. the extinction, of an electric arc that forms level with the corresponding movable contact 36. The piece 82 exerts a magnetic field which guides the electric arc towards a particular area of the arc extinguishing chamber.

Each blow piece 82 heretakes the shape of a U. More specifically, the base of this piece 82 here takes the shape of a U, the piece 82 extending by translation from this base in parallel to the axis X'. The piece 82 includes two opposite identical side partitions which are placed on either side of the corresponding movable contact 36, and extend perpendicularly to the axis Y' and in parallel to the axes X' and Z' and hence perpendicularly to the bottom plate 46. These side partitions are connected to one another by a curved partition rising in parallel to the axis X' and forming a bottom 83 of the U shape of the piece 82. The side partitions also include end edges, which are located opposite to the curved partition and extend in parallel to the axis X'.

Each wall 80 also includes here protective plates 84, which at least partially cover inner faces of the piece 82, providing protection from damage caused by the electric arc. The term "inner faces" refers to the faces which face towards the corresponding movable contact 36.

Optionally, the protective plates 84 include a folded-over edge 86 which covers and surrounds the end edges of the piece 82, here over their entire height. More specifically, each edge 86 is formed as a single piece with the corresponding plate 84, and extends as a prolongation that is folded back with respect thereto, so as to cover a part of the outer face of this piece 82. The folded-over edges 86 improve the effectiveness of the protective plates 84. In particular, they further improve tightness with respect to the breaking gases.

In this example, the members 88 are formed on the plates 84. As a variant, they may be formed differently.

The embodiments and the variants contemplated above may be combined with one another so as to create new embodiments.

The invention claimed is:

1. A removable electric current switching element, comprising:
   a first and a second housing part that are fittable to one another and reversibly movable with respect to one another between an assembled configuration in which the first housing part and the second housing part are fitted to one another and a partially disassembled configuration in which the first housing part and the second housing part are partially fitted to one another;
   fixed electrical contacts, which are rigidly connected to the first housing part; and
   movable electrical contacts movable with respect to the fixed electrical contacts, said movable electrical contacts being housed in the second housing part and being movable with respect to the second housing part,
   the first housing part including side walls provided with through inspection windows,
   the second housing part including insulating walls which each delimit a volume within the second housing part around a corresponding movable conductor, and
   the first and second housing parts being arranged relative to one another in such a way that, in the assembled configuration, the insulating walls mask the inspection windows and that, in the partially disassembled configuration, the insulating walls are away from the inspection windows to free access to the inspection windows.

2. The removable switching element according to claim 1, wherein the insulating walls include retaining members which cooperate with the first housing part to limit movement of the first and second housing parts from the assembled configuration to the partially disassembled configuration.

3. The removable switching element according to claim 1, wherein the first and second housing parts are further movable from the partially disassembled position to a dismantled position in which the first and second housing parts are separated from one another.

4. The removable switching element according to claim 2, wherein the retaining members are reversibly separable from the first housing part to allow the first and second housing parts to pass from the partially disassembled configuration to a dismantled configuration in which the first and second housing parts are separated from one another.

5. The removable switching element according to claim 1, wherein the first and second housing parts include attachment members that are complementary to one another for rigidly connecting the first and second housing parts to one another in the assembled configuration.

6. The removable switching element according to claim 1, wherein the second housing part is provided with a bottom plate which contains at least one channel for removing breaking gases fluidically connecting an inlet opening, in communication with a volume delimited by insulating walls inside the second housing part, to an outlet opening, in communication with an exterior of the second housing part.

7. The removable switching element according to claim 1, wherein the insulating walls and the side walls extend in parallel in one and a same direction, and wherein the first and second housing parts are moved by translation along said direction.

8. The removable switching element according to claim 1, wherein the inspection windows are made level with the fixed electrical contacts so as to allow observation thereof through the inspection windows when these windows are free.

9. The removable switching element according to claim 8, wherein the inspection windows take a shape of an oblong oriented in parallel to a direction of movement of the movable electrical contacts.

10. An electrical switching device for switching an electric current, comprising:
    a baseplate including one or more housings; and
    a removable electric current switching element to be accommodated in one of the housings of the baseplate, such that fixed electrical contacts of the removable electric current switching element are electrically connected to connection lands of the electrical switching device,
    wherein the removable electric current switching element includes
    a first and a second housing part that are fittable to one another and reversibly movable with respect to one another between an assembled configuration in which the first housing part and the second housing part are fitted to one another and a partially disassembled configuration in which the first housing part and the second housing part are partially fitted to one another, the fixed electrical contacts, which are rigidly connected to the first housing part, and movable electrical contacts movable with respect to the fixed electrical contacts, said movable electrical contacts being housed in the second housing part and being movable with respect to the second housing part, the first housing part including side walls provided with through inspection windows, the second housing part including insulating walls which each delimit a volume within the second housing part around a corresponding movable conductor, and the first and second housing parts being arranged relative to one another in such a way that, in the assembled configuration, the insulating walls mask the inspection windows and that, in the partially disassembled configuration, the insulating walls are away from the inspection windows to free access to the inspection windows.

* * * * *